United States Patent [19]

Danial et al.

[11] Patent Number: 5,175,459
[45] Date of Patent: Dec. 29, 1992

[54] LOW PROFILE VIBRATORY ALERTING DEVICE

[75] Inventors: Alfred N. Danial, S. Miami; Richard A. Ashley, Orlando, both of Fla.; Joseph C. Benedetto, Lynchburg, Va.

[73] Assignee: Motorola, Inc., Schaumburg, Ill.

[21] Appl. No.: 747,067

[22] Filed: Aug. 19, 1991

[51] Int. Cl.$^5$ .......................... H02K 1/38; G08B 5/24
[52] U.S. Cl. ..................... 310/81; 310/268; 340/407
[58] Field of Search ........................... 310/51, 81, 268; 340/311.1, 407; 434/113; 384/255

[56] References Cited

U.S. PATENT DOCUMENTS

| | | | |
|---|---|---|---|
| 4,728,837 | 3/1988 | Bhadra | 310/80 |
| 4,835,840 | 6/1989 | Stokes | 310/156 |
| 4,864,276 | 9/1989 | Tribbey et al. | 340/311.1 |
| 4,980,590 | 12/1990 | Taniguchi et al. | 310/156 |
| 5,036,239 | 7/1991 | Yamaguchi | 310/81 |

*Primary Examiner*—William H. Beha, Jr.
*Assistant Examiner*—D. L. Rebsch
*Attorney, Agent, or Firm*—Jose Gutman; Daniel R. Collopy; William E. Koch

[57] ABSTRACT

An electronic device, such as a selective call receiver, includes a housing (302) for the electronic device preferably having a rigid member (304) fixedly integrally attached thereto and extending therefrom, the rigid member constructed to cooperatively connect with a rotatable body (308) and to secure the rotatable body (308) to the housing (302) while allowing the rotatable body (308) to rotate about the rigid member (304), a circuit supporting substrate (301) arranged within the housing (302) coupled thereto, and an alerting device (300) for providing a vibratory alert. The alerting device (300) includes coils (320) on the circuit supporting substrate (301) arranged about the rigid member (304), with each coil (322) capable of being selectively energized. The alerting device (300) also includes a body (308) including magnetic material, preferably including a wedge-shaped mass (314), the body (308) rotatable about the rigid member (304) in a plane substantially parallel to the circuit supporting substrate (301) for directly generating vibrations in the housing (302) via the rigid member (304). Lastly, a selective energizing device (400) selectively energizes the coils (320) to rotate the body (308), to provide the vibratory alert.

22 Claims, 5 Drawing Sheets

— PRIOR ART —

LOW PROFILE VIBRATORY ALERTING DEVICE

FIELD OF THE INVENTION

This invention relates in general to the field of vibratory alerting devices, and more particularly to vibratory alerting devices that provide a tactile alert for use in portable communication devices, such as selective call receivers.

BACKGROUND OF THE INVENTION

Many portable communication devices such as selective call receivers, e.g. pagers, typically alert a user upon the occurrence of one of a number of possible events. The alert typically can be one of a visual, an audible or a tactile alert, or a combination thereof. The tactile alert normally provides a silent alert signal to the user. These alerting functions are well known in the art.

Conventional vibratory alerting devices (e.g., tactile alerting devices), such as shown in FIG. 1, have employed a vibrator motor 100, typically a dc motor, comprising a cylindrical housing 102 having a rotating shaft 104 attached to an external unbalanced counterweight 106 to provide the "silent" tactile alert. The cylindrical body 102 normally is held in place on a printed circuit board 108 by motor bracket 110. With this configuration, a dc current can be selectively applied to the vibrator motor 100 to consequently provide the tactile alert to the user.

A number of significant drawbacks have become evident with this conventional tactile alerting configuration. First, substantial size and bulk are added to the communication device, which is contrary to the current trend towards miniaturization in modern receiver designs. Second, the conventional vibrator motor 100 requires additional assembly time and post soldering operations, which significantly increases manufacturing costs. Third, subsequent repair costs are seriously affected by the required soldering/de-soldering of the vibrator motor 100, again adding costs to the product. Fourth, the required handling and the number of moving parts significantly increase the number of opportunities for introducing defects, both during manufacturing and during servicing, thereby degrading the overall quality of the product as perceived by the user. Lastly, the printed circuit board 108, which is typically flexible, tends to dampen the vibrating motion that is delivered to the housing and ultimately felt by the user as the tactile alert. Hence, the conventional vibrator motor 100 mounted on the printed circuit board 108 is inherently inefficient at delivering vibratory motion to the user, while significantly increasing the costs of the product and reducing the overall quality.

U.S. Pat. No. 4,728,837, issued to Krishna Bhadra on Mar. 1, 1988, shows a vibration generator useful for vibratory screening machinery. The construction and arrangement of the elements are typically directed toward vibrating processes such as vibratory screens. The size, bulk, and arrangement of the electromagnets, however, normally prohibits use of the vibration generator in a portable communication device such as a selective call receiver. Further, increased manufacturing costs, increased subsequent repair costs, and degraded quality as perceived by the user may be incurred due to the required number of parts and the number of assembly/disassembly steps.

Accordingly, there exists a need in the art for an improved vibratory alerting device.

SUMMARY OF THE INVENTION

In carrying out one form of this invention, there is provided an electronic device comprising a housing for the electronic device having a rigid member integrally attached thereto and extending therefrom, the rigid member constructed to cooperatively connect with a rotatable body and to secure the rotatable body to the housing while allowing the rotatable body to rotate about the rigid member, a circuit supporting substrate arranged within the housing and coupled thereto, and alerting means for providing a vibratory alert. The alerting means comprises a plurality of coils disposed on the circuit supporting substrate and arranged about the rigid member with each coil capable of being selectively energized, a body comprising magnetic material and coupling to the rigid member, the body rotatable about the rigid member in a plane substantially parallel to the circuit supporting substrate for directly generating vibrations in the housing via said rigid member, and selective energizing means for selectively energizing the plurality of coils to rotate the body to provide the vibratory alert.

DESCRIPTION OF A PREFERRED EMBODIMENT

Figure 2:
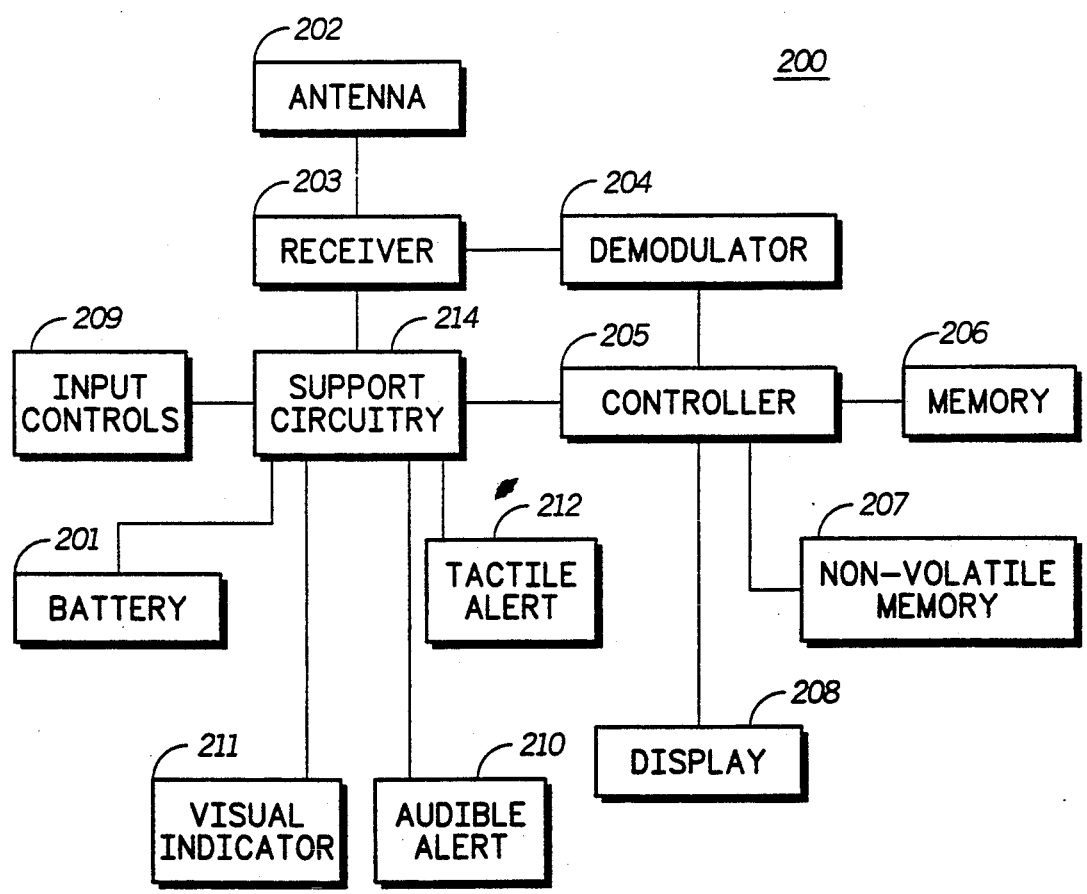
FIG. 2 is a block diagram of a typical paging receiver.

Referring to FIG. 2, a block diagram of an electronic device, such as a selective call receiver (e.g., a paging receiver) 200 is shown. The selective call receiver 200 is powered by a battery 201 and operates to receive a radio frequency signal via an antenna 202. A receiver 203 is coupled to a demodulator 204, which recovers any information signal present using conventional techniques. The recovered information signal from the demodulator 204 is coupled to a controller 205 which interprets and decodes the recovered information.

In the preferred embodiment, the controller 205 comprises a microcomputer, such as a Motorola, Inc. manufactured microcomputer (e.g., MC68HC05C4), and has a signal processor performing the function of a decoder, which is normally implemented in both hardware and software. The signal processor checks the recovered information signal for address information and correlates a recovered address with a predetermined address that is usually stored in the selective call receiver's non-volatile memory 207. When the addresses correlate, and in accordance with settings associated with user input controls 209, such as buttons or switches, the controller 205 normally stores a recovered message information in a memory 206.

Subsequently, the selective call receiver 200 typically presents at least a portion of the received message information to a user, such as by a display 208 (e.g., a liquid crystal display). Usually, an audible alert indicator device 210 (e.g., a speaker or a piezoelectric transducer), a visual alert indicator device 211 (e.g., a lamp, a light emitting diode, or an icon representation on the display 208); a vibratory alert indicator device (e.g., a tactile alerting device) 212, or a combination of the aforementioned alert indicator devices alerts the user that a message has been received. The user then views at least a portion of the message information presented on the display 208 by activating the user input controls 209.

A support circuit 214 preferably comprises a conventional signal multiplexing integrated circuit, a voltage regulator and control mechanism, a current regulator and control mechanism, environmental sensing circuitry such as for light or temperature conditions, audio power amplifier circuitry, control interface circuitry, and display illumination circuitry. These elements are arranged to provide support for the functions of the selective call receiver 200 as may be requested by a user. The operation of a paging receiver of the type shown in FIG. 2 is well known and is more fully described in U.S. Pat. No. 4,518,961, issued May 21, 1985, entitled "Universal Paging Device with Power Conservation".

Figure 1:
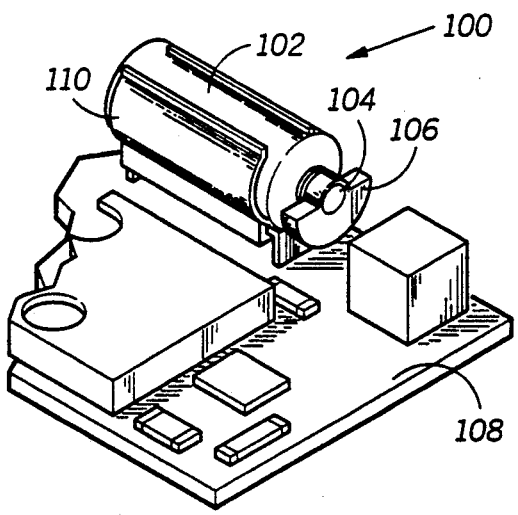
FIG. 1 is a perspective view of a conventional vibrator attached to a printed circuit board.

Additionally, the support circuit 214 typically includes an electrical switching circuit (not shown), responsive to the controller 205, for selectively energizing the vibratory alert indicator device 212 as discussed earlier for FIG. 1. For example, a dc current can be switched in circuit with the vibrator motor 100 (FIG. 1) to consequently provide the tactile alert to the user. Normally, after a predetermined time interval, such as 8 seconds, the controller 205 de-energizes the tactile alert indicator device 212 by removing (i.e., switching out) the dc current from the vibrator motor 100. In this way, the selective call receiver 200 is capable of providing the tactile alert to the user.

Figure 3A:
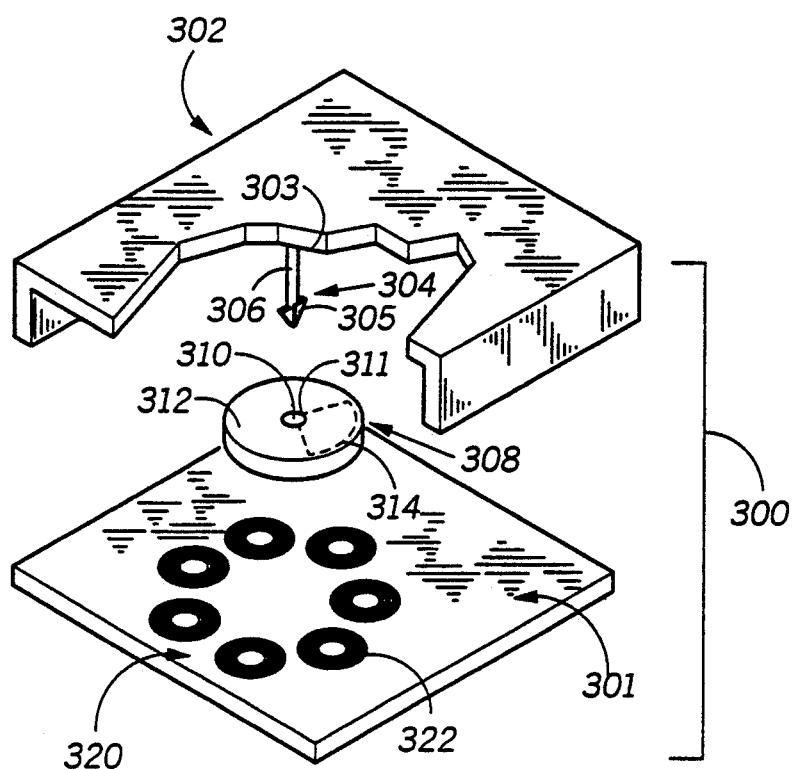
FIG. 3A is an exploded cut-away view of a housing and a vibratory alerting device for a paging receiver constructed and arranged in a low volumetric format, according to the preferred embodiment of the present invention.

According to the preferred embodiment of the present invention, a vibratory alerting device (e.g., a tactile alerting device) 300, a circuit supporting substrate (e.g., a printed circuit board) 301, and a housing 302 for a paging receiver are shown in FIG. 3A in an exploded cut-away view. The vibratory alerting device 300, circuit supporting substrate 301, and housing 302 are constructed and arranged in a low volumetric (e.g., credit card) format, which are shown in closer proximity to each other in FIG. 3B, as may be requested by a user.

A rigid member preferably extends from the inner surface 303 of the housing 302, and preferably comprises a pin structure 304 that is integral to the housing 302. Conventional injection plastic molding techniques may provide the pin structure 304 integrally molded to the housing 302. Optionally, the integral pin structure 304 may comprise a metallic material (e.g., brass) that is integrated into the housing 302 using known techniques. By integrating the pin structure 304 into the housing 302, the vibrations of the vibratory alerting device 300 are optimally coupled to the user of the device, enhancing the performance of the vibratory alerting device 300, as shown in FIGS. 3A and 3B and as will be more fully discussed below.

Figure 3B:
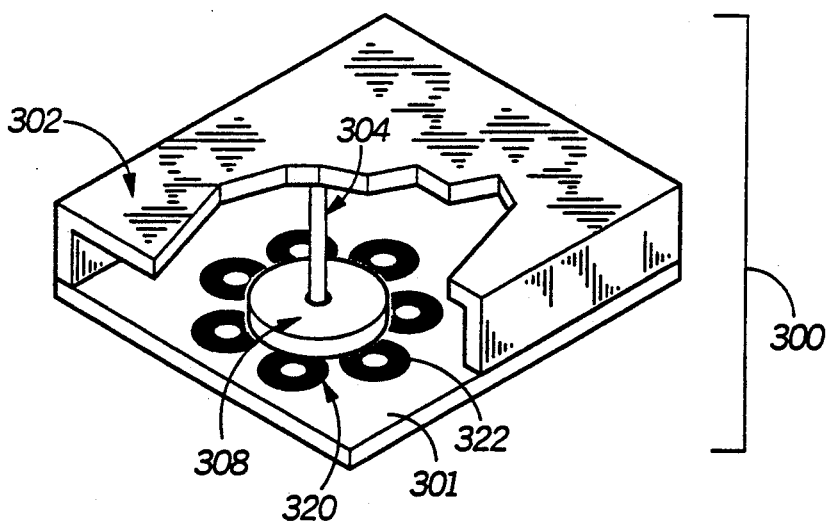
FIG. 3B shows the elements of FIG. 3A in closer proximity to each other.
Figure 3C:
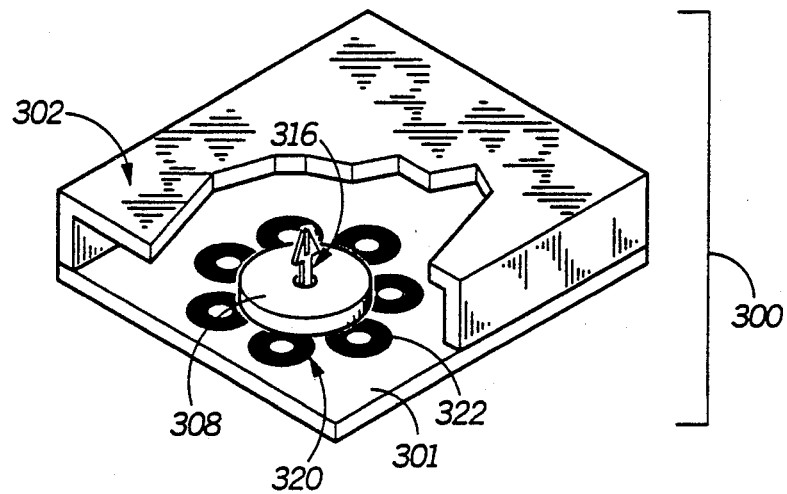
FIG. 3C illustrates an alternative arrangement for a vibratory alerting device similar to the low volumetric format paging receiver of FIG. 3A, in accordance with the present invention.

Optionally, as shown in FIG. 3C, a rigid member 316 may be integrated into the circuit supporting substrate 301. The rigid member 316 may comprise a metallic post or pin structure 316 that is rigidly coupled to the circuit supporting substrate 301 is normally coupled to the housing 302, vibratory alerting device 300' couples the vibrations to the housing 302 (and to the user of the device) via the circuit supporting substrate 301. Since the circuit supporting substrate 301 may dampen the vibrations that are coupled to the housing 302 the arrangement depicted in FIGS. 3A and 3B are preferably for delivering vibratory motion to the housing 302.

According to the preferred embodiment, as shown in FIGS. 3A and 3B, the tip portion of the integral pin structure 304 is preferably constructed having a plurality of flexible extensions 305 to cooperatively connect with a rotatable body 308. The body 308 preferably comprises magnetic material, e.g., a magnetic counterweight 308, and has an aperture 310 that cooperatively connects with the integral pin structure 304, preferably via the flexible extensions 305, to secure the magnetic counterweight 308 to the housing 302 while allowing the magnetic counterweight 308 to rotate about the integral pin structure 304. The magnetic counterweight 308 rotates in a plane that is substantially parallel to the circuit supporting substrate 301, as shown in FIG. 3B and as will be more fully discussed below.

Additionally, the magnetic counterweight 308 preferably comprises a non-magnetic disc 312, such as a plastic disc, having a substantially circular periphery that is substantially concentric with the aperture 310 on the non-magnetic disc 312. By way of the aperture 310, the non-magnetic disc 312 can be secured to the integral pin structure 304 and can spin thereon. In the preferred embodiment, a bearing 311, optionally using a metallic sleeve insert at the aperture 310 of the non-magnetic disc 312, is coupled to the aperture 310 and cooperatively connects with the integral pin structure 304 about the shaft portion 306. The bearing 311 coupled to the integral pin structure 304 and to the perimeter of the aperture 310 operates to reduce wear due to friction and to extend the useful life of the device.

Moreover, a geometrically shaped mass, preferably irregularly shaped such as the wedge-shaped mass, depicted in FIGS. 3A and 3B, comprising magnetic material 314 is coupled to the non-magnetic disc 312, preferably attached on the underside of the non-magnetic disc 312, using known techniques, as shown with hidden lines in FIG. 3A. The wedge-shaped mass comprising magnetic material 314 is constructed preferably using standard powder metallurgy techniques, and substantially provides the mass for the magnetic counterweight 308 that rotates about the integral pin structure 304 for generating vibrations at the housing 302. This rotation provides the vibratory (tactile) alert to the user. It may be appreciated by one of ordinary skill that the wedge-shaped mass comprising magnetic material 314 can include the aperture 310, preferably located substantially at a first end such as the point of its wedge, for providing the rotatable body 308 in accordance with the present invention. However, the use of the non-magnetic disc 312 coupled to the wedge-shaped mass comprising magnetic material 314, in the preferred embodiment, may enhance the manufacturing and assembly processes of the device.

Hence, the combined non-magnetic disc 312 and wedge-shaped mass comprising magnetic material 314 with common aperture 310 constitute the magnetic counterweight 308. Further, the magnetic counterweight 308, being rotatably coupled at the first end to the integral pin structure 304 via the bearing 311, is capable of rotating about the integral pin structure 304 with inertial eccentricity to inherently produce the imbalance and deliver motion to the housing 302. This motion provides the vibratory (tactile) alert to the user of the device. Moreover, the integral pin structure 304 being fixedly attached to the housing 302, and preferably being integrally formed therein, optimally delivers the vibratory motion to the housing. This arrangement is a significant advantage over the conventional vibratory alerting device of FIG. 1 for providing vibratory motion to the external housing, as discussed earlier.

In one method for securing the magnetic counterweight 308 to the housing 302, the flexible extensions 305 can be deflected radially inward to mate the integral pin structure 304 with the rotatable body 308 at the aperture 310. Once the tip portion of the integral pin structure 304 passes clear through the other side of the non-magnetic disc 312, the flexible extensions 305 can restore to their original positions such that the tip portion of the integral pin structure 304 provides no clearance for the aperture 310, thereby securing the rotatable body 308 to the integral pin structure 304. Further, the aforementioned mating arrangement allows the non-magnetic disc 312 to rotate on the integral pin structure 304. Clearly, the insertion process can simply be reversed to remove the non-magnetic disc 312 from the integral pin structure 304, as may be necessary for servicing the device.

A plurality of coils 320 is disposed on the circuit supporting substrate 301 and arranged such that when the circuit supporting substrate 301 is arranged within the housing, the plurality of coils 320 is arranged about the integral pin structure 304. In the preferred embodiment, the plurality of coils 320 is etched onto the circuit supporting substrate 301 using conventional techniques. Conventional manufacturing of the circuit supporting substrate (e.g., the printed circuit board) 301 allows efficient and cost effective production of the plurality of coils 320. Preferably, each coil 322 comprises a winding trace on the circuit supporting substrate 301 that includes two terminals, allowing selective energizing of individual coils 322, as will be more fully discussed below.

Figure 4:
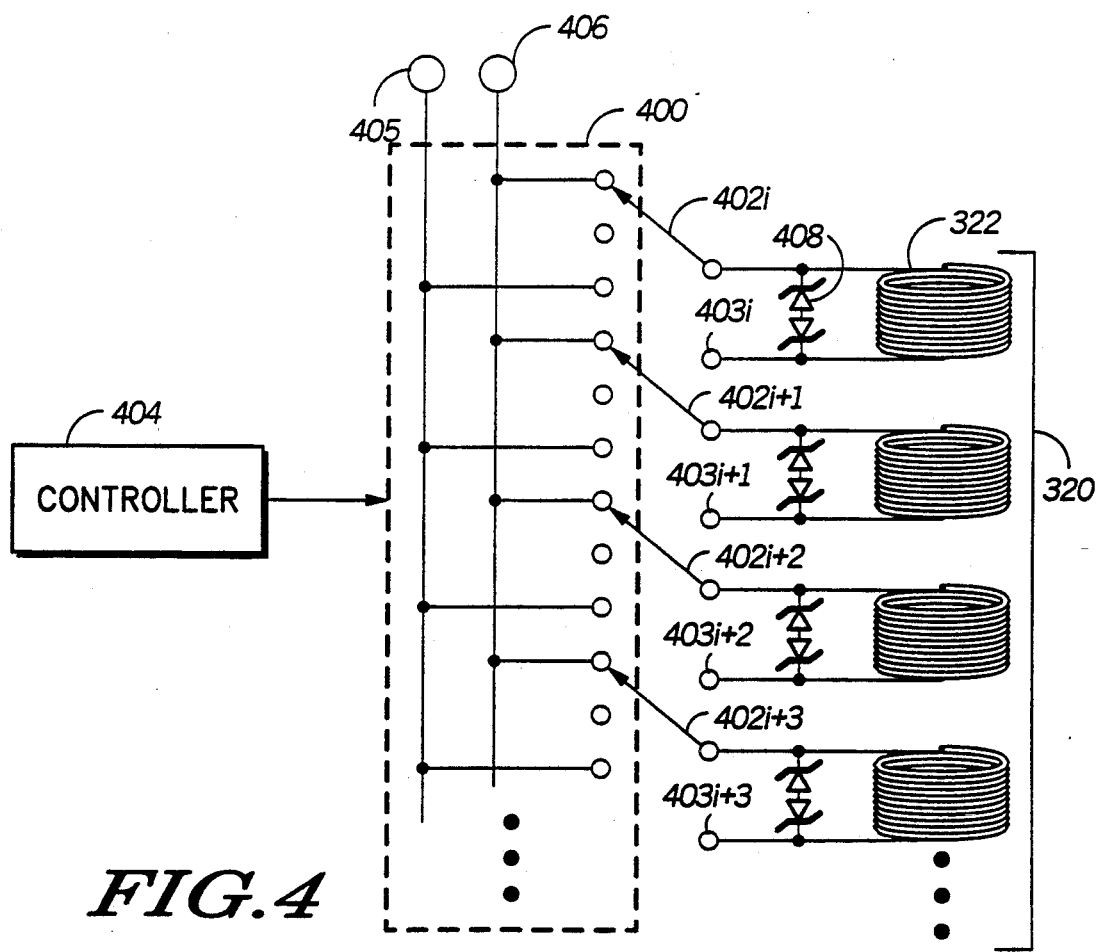
FIG. 4 is a block diagram of a selective energizing device that may be used for selectively energizing a plurality of coils, according to the present invention.

Referring to FIG. 4, a block diagram of a selective energizing device 400 that may be used for selectively energizing the plurality of coils 320 is shown, according to the present invention. Switching devices 402i are responsive to signals from a controller 404 to selectively couple a current source 406 to any one of the coils 322, or a combination thereof. Each coil 322 is preferably electrically coupled at its return terminal 403i to ground on the circuit supporting substrate 301 (FIG. 3). Consequently, the plurality of coils 320 can be selectively energized/de-energized as necessary. Each coil 322 preferably is associated with protection back-to-back zener diodes 408 or other protection device, using known circuit design techniques. In this way, the switching devices 402i and other associated circuitry may be protected from switching voltages during energizing/de-energizing of the plurality of coils 320.

By providing a current to any one of the coils 322, a magnetic field corresponding to one of a north magnetic pole or a south magnetic pole may be formed at the coil 322. The polarity of the current that is selectively provided to energize a coil corresponds to the creation of the north magnetic pole or the south magnetic pole at the coil oriented towards the plane of rotation of the magnetic counterweight 308. Hence, individual coils 322, or a combination thereof, can be selectively energized using an electrical current of a polarity to actuate the rotating wedge-shaped magnet 314 and magnetic counterweight 308, as will be more fully discussed below.

Figures 5A, 5B, 5C:
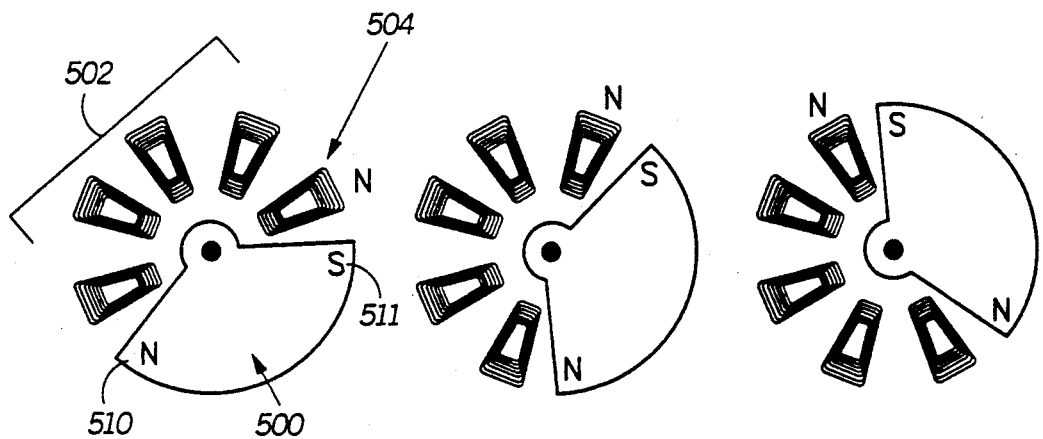
FIGS. 5A, 5B, and 5C are top cut-away views of a magnetic counterweight and a plurality of coils shown in three respective positions according to a first embodiment of the present invention.

Referring to FIGS. 5A, 5B, and 5C, a top cut-away view of a wedge-shaped magnetic counterweight 500 and a plurality of coils 502 is shown in three respective rotating positions, according to a first embodiment of the present invention. The wedge-shaped magnetic counterweight 500 comprises north 510 and south 511 magnetic poles arranged at least at either side of a second end of the counterweight 500, the second end being located substantially opposite to the first end, such as the outer radius of the wedge. The magnetic poles may be constructed as part of the process of creating the counterweight 500 using known methods. As discussed earlier, the wedge-shaped magnetic counterweight 500 is capable of rotating about the rigid member (e.g., the integral pin structure) 304 (FIG. 3) to provide the vibratory alert. Further the current source 406 for this embodiment is preferably a direct current (dc) source.

A controller 404, such as shown in FIG. 4, may selectively energize the plurality of coils 502, as shown in FIG. 5, in a predetermined sequence to actuate the wedge-shaped magnetic counterweight 500 in rotational motion. Each coil 504, in this embodiment, may be energized to provide a north magnetic pole as shown. The sequential pulsing (i.e., energizing and de-energizing) of individual coils 504 creates a moving magnetic force that progressively attracts the wedge-shaped magnetic counterweight 500 in a rotational orbit about the integral pin structure 304 (FIG. 3). The rotation is in a plane that is substantially parallel to the circuit supporting substrate 301.

Figures 6A, 6B, 6C:
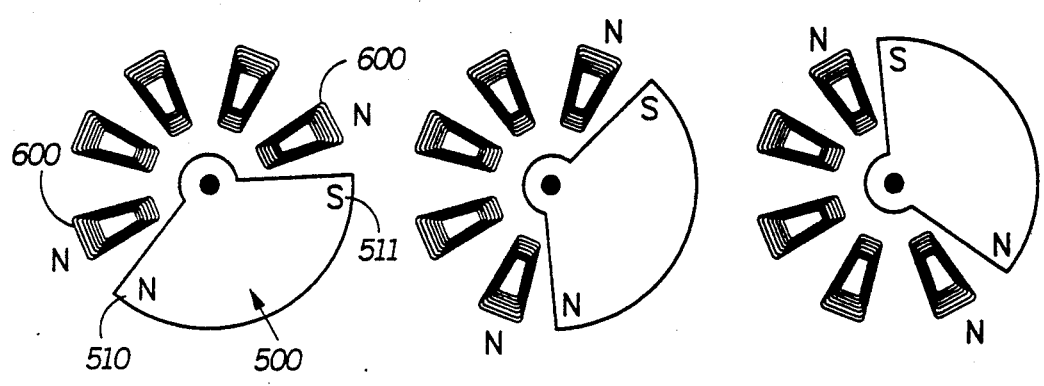
FIGS. 6A, 6B, and 6C are top cut-away views of the magnetic counterweight and the plurality of coils shown in three respective positions according to a second embodiment of the present invention.

Referring to FIGS. 6A, 6B, and 6C, two coils 600 may be energized contemporaneously in similar fashion as discussed for FIG. 5. However, in this embodiment, both repulsive and attractive magnetic force is provided on the respective magnetic poles (510 and 511) to actuate the rotation of the wedge-shaped magnetic counterweight 500. This adds more magnetic force for actuating the rotational motion of the magnetic counterweight 500. Of course, additional magnetic poles on the magnetic counterweight 500 and additional coils being energized, respectively, will apply even greater magnetic force for actuating the rotational motion of the magnetic counterweight 500.

Figure 7:
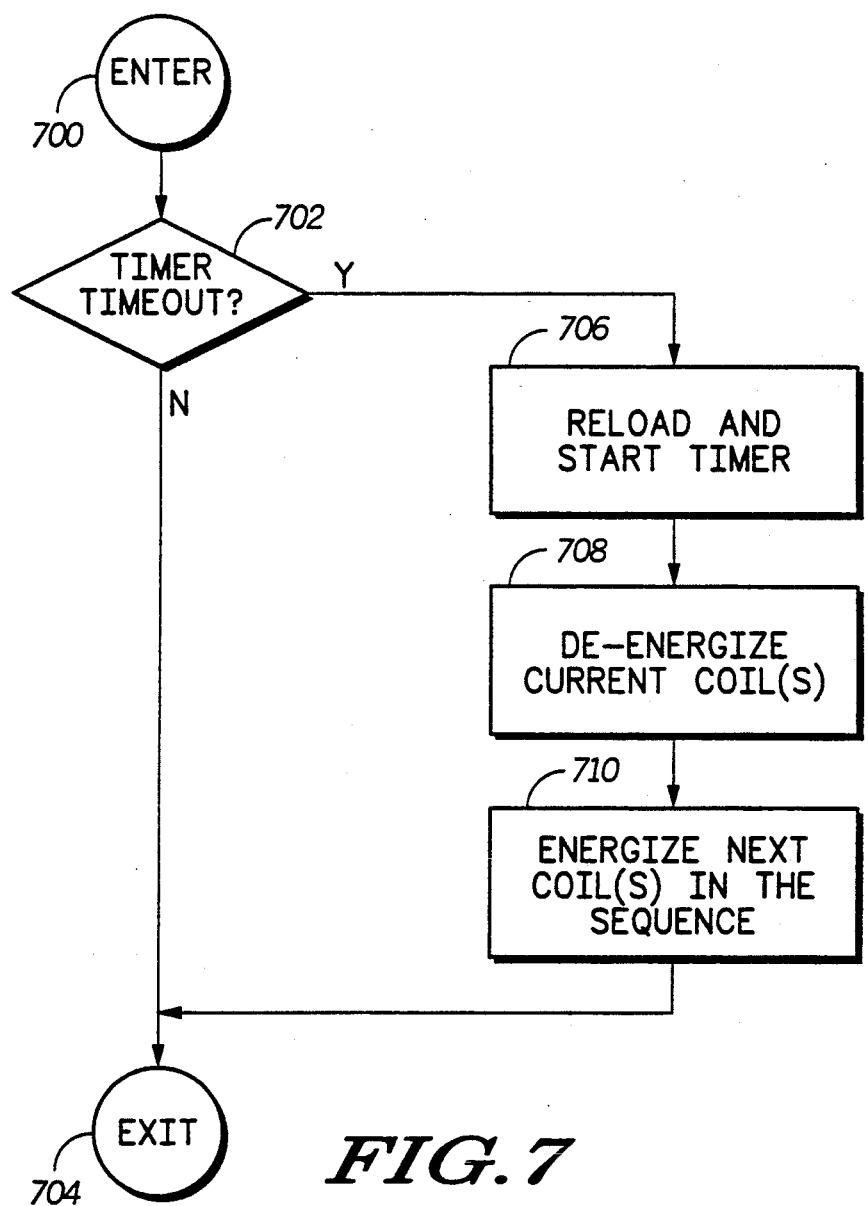
FIG. 7 is a flow diagram for a controller coupled to the selective energizing device of FIG. 4, in accordance with the first and second embodiments of the present invention, respectively.

FIG. 7 shows a flow diagram for the controller 404 (FIG. 4). For a predetermined time interval the controller selects and energizes the next coil in the sequence (700, 702, 706, 708, 710, and 704). The pulse duration is timed (i.e., preferably by using a timer module, such as in the Motorola, Inc. manufactured microcomputer MC68HC05C4) to provide attractive magnetic force, repulsive magnetic force, or both (as shown in FIG. 6) to move the counterweight 500 accordingly (700, 702, and 704). Note that steps 708 and 710, for the embodiment of FIGS. 6A, 6B, and 6C, will energize/de-energize two coils 600 at a time, thus providing additional magnetic force for actuating the counterweight 500. Additionally, the rate of pulsing of sequential coils 320 may progressively increase to develop a desired rotational velocity for the rotating counterweight 500. At mechanical resonance for the vibrating system, the impulses generated by the rotating body 308 optimally provide the vibratory alert at the housing 302.

Figures 8A, 8B, 8C:
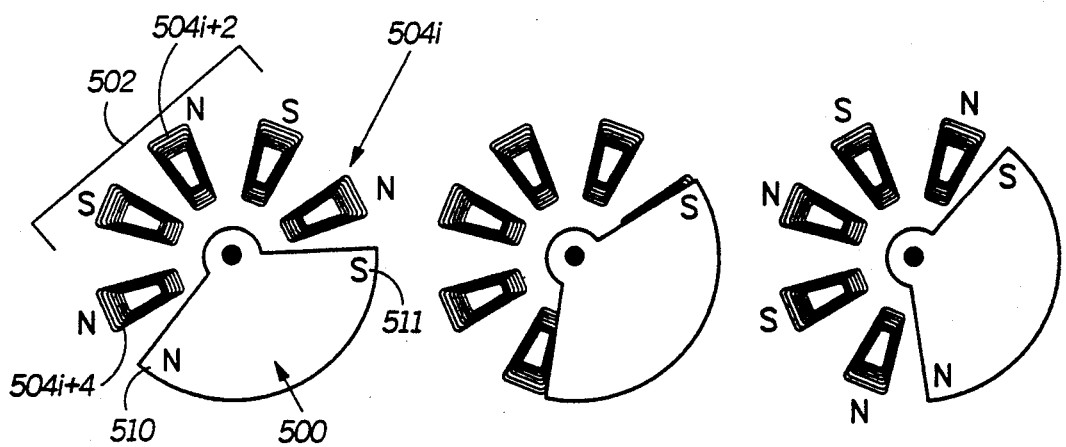
FIGS. 8A, 8B, and 8C are top cut-away views of a magnetic counterweight and the plurality of coils shown in three respective positions according to a third embodiment of the present invention.
Figure 9:
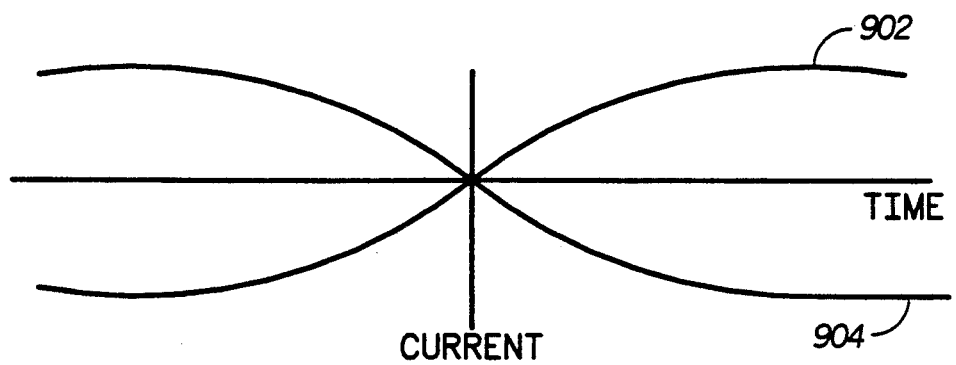
FIG. 9 is a current vs. time diagram showing two alternating current signals 180° out of phase for selectively inducing magnetic polarities on the plurality of coils of FIG. 8.

Referring to FIGS. 8A, 8B, and 8C, the magnetic counterweight 500 and the plurality of coils 502 are shown in three respective positions according to a third embodiment of the present invention. A first alternating current source 406 (FIG. 4) and a second alternating current source 405 may be selectively coupled to the plurality of coils 502 of FIG. 8, thereby inducing magnetic polarities on the plurality of coils 502. FIG. 9 shows a current vs. time diagram for two alternating current signals (902 and 904) for the first and second respective current sources (405 and 406). The two alternating current signals are preferably 180° out of phase with respect to each other.

In this embodiment, eight exemplary coils 504$i$ thru 504$i$+7 are disposed on the circuit supporting substrate 301. The first alternating current signal 902 may be selectively applied to coils 504$i$, 504$i$+2, and 504$i$+4, and 504$i$+6, and a second alternating current 904, preferably being substantially 180° out of phase with respect to the first alternating current 902, may be selectively applied to coils 504$i$+1, 504$i$+3, 504$i$+5, and 504$i$+7. In this way, each coil 504 is alternating between a north magnetic pole and a south magnetic pole. Further, adjacent coils are energized to contemporaneously alternate between a north magnetic pole and a south magnetic pole.

The magnetic force applied by this configuration to actuate the wedge-shaped magnetic counterweight 500 is significantly increased over the first embodiment discussed earlier, since a north/south magnetic pole pair, such as 504$i$+4 and 504$i$+5, operates with stronger magnetic force on each magnetic pole 510 of the wedge-shaped magnetic counterweight 500. The rotational velocity of the magnetic counterweight 500 may be regulated by the period of the alternating currents (902 and 904) and their relative phase relationship. In this way, the rotation of the counterweight 500 may be selected to provide mechanical vibrations at the optimum mechanical resonance for the vibration system. At mechanical resonance, the system uses significantly less energy to vibrate the housing 302 (and thus the selective call receiver), which increases the overall system's battery life.

Therefore, an improved vibratory alerting device 300 has been shown, which overcomes the size and bulk limitations of the prior art, while reducing the total number of parts (particularly moving part) in a product and providing more vibration to the external housing for reliably alerting the user. Accordingly, manufacturing and repair costs are reduced and a higher overall product quality is perceived by the user.

What is claimed is:

1. An electronic device, comprising:
   a. housing for the electronic device having a rigid member integrally attached thereto and extending therefrom, the rigid member constructed to cooperatively connect with a rotatable body and to secure the rotatable body to the housing while allowing the rotatable body to rotate about the rigid member;
   a circuit supporting substrate arranged within the housing and coupled thereto; and
   alerting means for providing a vibratory alert, the alerting means comprising:
      a plurality of coils disposed on the circuit supporting substrate and arranged about the rigid member with each coil capable of being selectively energized;
      a body comprising magnetic material and coupling to the rigid member, the body rotatable about the rigid member in a plane substantially parallel to the circuit supporting substrate for directly generating vibrations in the housing via said rigid member; and
      selective energizing means for selectively energizing the plurality of coils to rotate the body to provide the vibratory alert.

2. The electronic device of claim 1, wherein the body comprises:
   a non-magnetic disc having a substantially circular periphery and an aperture substantially concentric with the substantially circular periphery, the aperture allowing the non-magnetic disc to be secured to the rigid member and to rotate thereon; and
   a wedge-shaped mass comprising magnetic material coupled to the non-magnetic disc.

3. The electronic device of claim 1, wherein the rigid member is integrally formed in the housing.

4. The electronic device of claim 1, wherein the rigid member comprises a tip portion having a plurality of flexible extensions, and the rotatable body includes an aperture to cooperatively connect with the rigid member via the flexible extensions to secure the rotatable body to the housing while allowing the rotatable body to rotate about the rigid member.

5. The electronic device of claim 1, wherein the rigid member comprises plastic material formed as part of the housing.

6. The electronic device of claim 1, wherein the plurality of coils is etched onto the circuit supporting substrate along with other electronic circuits for the electronic device.

7. The electronic device of claim 1, wherein the body comprises a wedge-shaped mass comprising magnetic material having an aperture located substantially at the point of the geometrically shaped mass for coupling the wedge-shaped mass to the rigid member via the aperture, the wedge-shaped mass comprising magnetic material substantially providing the mass for the rotatable body, and further wherein the selective energizing means selectively energizes at least one coil of the plurality of coils to provide a magnetic field corresponding to one of a north magnetic pole or a south magnetic pole at the at least one coil to rotate the body to provide the vibratory alert.

8. The electronic device of claim 7, wherein the wedge-shaped mass comprising magnetic material is the rotatable body for providing the vibratory alert, and comprises north and south magnetic poles arranged at least at first and second ends of the outer radius of the wedge-shaped mass.

9. The electronic device of claim 8, wherein the plurality of coils comprises first and second coils arranged substantially about a circumference with an angular distance corresponding to the first and second ends of the outer radius of the geometrically shaped mass, and wherein the selective energizing means contemporaneously energizes the first and second coils to provide a magnetic field corresponding to one of a north magnetic pole or a south magnetic pole at both the first and second coils when the first and second ends of the geometrically shaped mass are substantially oriented with the first and second coils, respectively, for rotating the body to provide the vibratory alert.

10. The electronic device of claim 8, wherein the plurality of coils is arranged substantially about a circumference corresponding to the outer radius of the wedge-shaped mass and the selective energizing means contemporaneously energizes the plurality of coils with at least one alternating current signal, such that each coil alternates between a north and south magnetic pole and adjacent coils are energized to contemporaneously alternate between north and south magnetic poles, to provide north/south adjacent magnetic pole pairs operating to attract and repel each magnetic pole of the wedge-shaped mass.

11. A selective call receiver, comprising:
receiver means for selectively receiving and presenting a message;
a housing for the selective call receiver having a rigid member integrally attached thereto and extending therefrom, the rigid member constructed to cooperatively connect with a rotatable body and to secure the rotatable body to the housing while allowing the rotatable body to rotate about the rigid member;
a circuit supporting substrate arranged within and coupled to the housing and having the receiver means coupled thereto; and
alerting means for providing a vibratory alert, the alerting means comprising:
a plurality of coils disposed on the circuit supporting substrate and arranged about the rigid member with each coil capable of being selectively energized;
a rotatable body coupled to the rigid member, the body rotatable about the rigid member in a plane substantially parallel to the circuit supporting substrate for directly generating vibrations in the housing via said rigid member; and
selective energizing means for selectively energizing the plurality of coils to rotate the body to provide the vibratory alert.

12. The selective call receiver of claim 11, wherein the rigid member is integrally formed in the housing and extending from the inner surface thereof.

13. The selective call receiver of claim 11, wherein the rigid member comprises plastic material formed as part of the housing.

14. The selective call receiver of claim 11, wherein the rigid member comprises a tip portion having a plurality of flexible extensions, and the rotatable body includes an aperture to cooperatively connect with the rigid member via the flexible extensions to secure the rotatable body to the housing while allowing the rotatable body to rotate about the rigid member.

15. The selective call receiver of claim 11, wherein the plurality of coils is etched onto the circuit supporting substrate along with other electronic circuits for the selective call receiver.

16. The selective call receiver of claim 11, wherein the body is a wedge-shaped mass comprising magnetic material having an aperture located substantially at the point of the wedge-shaped mass for coupling the wedge-shaped mass to the rigid member via the aperture, and further wherein the selective energizing means selectively energizes at least one coil of the plurality of coils to provide a magnetic field corresponding to one of a north magnetic pole or a south magnetic pole at the at least one coil to rotate the wedge-shaped mass to provide the vibratory alert.

17. The selective call receiver of claim 16, wherein the wedge-shaped mass comprises magnetic material having north and south magnetic poles arranged at least at first and second ends of the outer radius of the wedge-shaped mass.

18. The selective call receiver of claim 17, wherein the plurality of coils comprises first and second coils arranged substantially about a circumference with an angular distance corresponding to the first and second ends of the outer radius of the wedge-shaped mass, and wherein the selective energizing means contemporaneously energizes the first and second coils to provide a magnetic field corresponding to one of a north magnetic pole or a south magnetic pole at both the first and second coils when the first and second ends of the wedge-shaped mass are substantially oriented with the first and second coils, respectively, for rotating the body to provide the vibratory alert.

19. The selective call receiver of claim 17, wherein the plurality of coils is arranged substantially about a circumference corresponding to the outer radius of the wedge-shaped mass and the selective energizing means contemporaneously energizes the plurality of coils by providing at least one alternating current signal to the plurality of coils, such that each coil alternates between a north and south magnetic pole and adjacent coils are energized to contemporaneously alternate between north and south magnetic poles, to provide north/south adjacent magnetic pole pairs operating to attract and repel each magnetic pole of the wedge-shaped mass.

20. A selective call receiver, comprising:
receiver means for selectively receiving a message;
a housing for the selective call receiver;
a circuit supporting substrate having a rigid member fixedly attached thereto and extending therefrom, and having the receiver means coupled thereto, the circuit supporting substrate coupled to the housing and the rigid member including a tip portion having a plurality of flexible extensions for coupling to a rotatable body to secure the rotatable body to the housing while allowing the rotatable body to rotate about the rigid member; and alerting means for providing a vibratory alert, the alerting means comprising:
  a plurality of coils disposed on the circuit supporting substrate and arranged about the rigid member with each coil capable of being selectively energized;
  a rotatable counterweight coupled to the rigid member, the counterweight rotatable about the rigid member in a plane substantially parallel to the circuit supporting substrate; and
  selective energizing means for selectively energizing the plurality of coils to rotate the counterweight to provide the vibratory alert.

21. An electronic device, comprising:
a housing for the electronic device;
a circuit supporting substrate having a rigid member fixedly attached thereto and extending therefrom, the circuit supporting substrate coupled to the housing, and the rigid member including a tip portion having a plurality of flexible extensions for coupling to a rotatable body to secure the rotatable body to the housing while allowing the rotatable body to rotate about the rigid member; and
alerting means for providing a vibratory alert, the alerting means comprising:
  a plurality of coils disposed on the circuit supporting substrate and arranged about the rigid member with each coil capable of being selectively energized;
  a body rotatably coupled to the rigid member, the body rotatable about the rigid member in a plane substantially parallel to the circuit supporting substrate; and
  selective energizing means for selectively energizing the plurality of coils to rotate the body to provide the vibratory alert.

22. A pager, comprising:
a plastic housing for the pager having an inner surface with a plastic molded pin structure extending therefrom;
a printed circuit board coupled to the housing and arranged within the housing in a plane substantially parallel to the inner surface;
receiver means, coupled to the printed circuit board, for selectively receiving a message;
controller means coupled to the printed circuit board and to the receiver means for presenting the received message; and
tactile alerting means responsive to the controller means for providing a tactile alert along with receiving the message, the tactile alerting means comprising:
  a plurality of coils etched on the printed circuit board along with other electronic circuits for the pager, the plurality of coils arranged about a circumference that is substantially concentric with the plastic molded pin structure, each coil capable of being selectively energized;
  a wedge-shaped magnetic counterweight having a bearing that cooperatively connects with the pin structure to secure the magnetic counterweight to the housing while allowing the magnetic counterweight to rotate about the circumference; and
  selective energizing means responsive to the controller means for selectively providing a direct current to energize at least one coil of the plurality of coils, and consequently to actuate the rotating wedge-shaped magnetic counterweight to provide the tactile alert.

* * * * *